UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER SOLVENT AND COMPOSITION.

1,405,487. Specification of Letters Patent. Patented Feb. 7, 1922.

No Drawing. Application filed June 9, 1921. Serial No. 476,318.

*To all whom it may concern:*

Be it known that I, STEWART J. CARROLL, a citizen of the United States of America, residing at Rochester, in the county of Monroe and State of New York, have invented certain new and useful Improvements in Cellulose-Ether Solvents and Compositions, of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates but is not limited to the ethers having that property. While the ethers form thin solutions in methyl alcohol or in chloroform, it has been found that such single solvents by themselves will not dissolve a sufficient proportion of the ethers to make a desirably thick flowable composition or dope, such as may be used in the manufacture of photographic film base by the customary methods, or in the other plastic arts.

I have discovered that an adequately strong and useful compound solvent may be prepared by mixing chloroform with methyl alcohol. While they may be mixed in varying proportions, it is noted, by way of example, that a useful solvent can be formed by mixing from 90 to 25 parts by weight of chloroform and 10 to 75 parts of methyl alcohol. I prefer a mixture of these liquids in equal parts by weight. The amount of ether dissolved in the solvent can be varied to suit the needs of the manufacturer, but, for purposes of illustration, it is noted that a useful viscous flowable solution may be obtained by dissolving 1 part of water-insoluble ethyl cellulose in from 4 to 6 parts by weight of the mixed solvent. Other substances which impart additional suppleness, or incombustibility, or other qualities, to the film may then be added to the film, such, for instance, as triphenyl or tricresyl phosphate, camphor, etc.

The ingredients are of the ordinary commercial type and sufficiently purified for the process of film manufacture, so as to give a dope yielding films having the proper relative freedom from color. The viscous flowable dope above described can be used in connection with the usual film-forming apparatus without the necessity of expensive alterations in the latter.

Having thus described my invention, what I claim as new and desire to secure by Letters Patent is:

1. A compound solvent for ethers of cellulose, comprising a mixture of chloroform and methyl alcohol.

2. A compound solvent for alkyl ethers of cellulose, comprising approximately 90 to 25 parts by weight of chloroform and 10 to 75 parts of methyl alcohol.

3. A composition of matter, comprising an ether of cellulose dissolved in a mixture of chloroform and methyl alcohol.

4. A viscous flowable film-forming composition, comprising an alkyl ether of cellulose dissolved in a compound solvent containing approximately 90 to 25 parts by weight of chloroform and 10 to 75 parts of methyl alcohol.

5. A composition of matter, comprising water-insoluble ethyl cellulose, methyl alcohol and chloroform.

6. A composition of matter, comprising one part by weight of ethyl cellulose dissolved in from 4 to 6 parts of a mixture of chloroform and methyl alcohol.

Signed at Rochester, New York, this fourth day of June, 1921.

STEWART J. CARROLL.